United States Patent [19]

Mita et al.

[11] Patent Number: 4,741,779
[45] Date of Patent: May 3, 1988

[54] ADDITIVES FOR RESINS AND THEIR COMPOSITION

[75] Inventors: Muneo Mita; Kouji Kashiwase; Tetsuya Osaki, all of Tokyo, Japan

[73] Assignees: Nippon Chemical Industrial Co. Ltd.; Kosei Co. Ltd., both of Tokyo, Japan

[21] Appl. No.: 884,373

[22] Filed: Jul. 11, 1986

[30] Foreign Application Priority Data

Jul. 19, 1985 [JP] Japan .................. 60-158272
Sep. 24, 1985 [JP] Japan .................. 60-208953

[51] Int. Cl.$^4$ .................. C04B 14/04; C08K 3/34
[52] U.S. Cl. .................. 106/288 B; 524/450
[58] Field of Search .......... 524/450; 106/288 B; 502/64

[56] References Cited

U.S. PATENT DOCUMENTS

| | | | |
|---|---|---|---|
| 2,848,346 | 8/1958 | Bertorelli | 106/288.8 |
| 3,054,769 | 9/1962 | Pike | 524/450 |
| 3,428,595 | 2/1969 | Tsukada et al. | 524/450 |
| 3,518,206 | 6/1970 | Sowards et al. | 502/64 |
| 3,844,977 | 10/1974 | Young | 502/64 |
| 3,894,983 | 7/1975 | Higbee | 524/450 |
| 4,113,659 | 9/1978 | Michalko | 502/64 |
| 4,198,320 | 4/1980 | Chester et al. | 502/64 |
| 4,250,081 | 2/1981 | Bode et al. | 524/450 |

FOREIGN PATENT DOCUMENTS

59-156913  9/1984  Japan ........................ 502/64

*Primary Examiner*—Lewis T. Jacobs
*Attorney, Agent, or Firm*—Tilton, Fallon, Lungmus & Chestnut

[57] ABSTRACT

This invention provides an additive for resins prepared by mixing (i) an A-type zeolite having a substantially spherical form and a median particle size not larger than 5 μm or an acid treated product thereof, and (ii) fine amorphous silica. The additive has high lubricating qualities and free-flowing properties. A resin composition comprising said additive shows good heat stability, antioxidizing and antiblocking properties.

11 Claims, No Drawings

ADDITIVES FOR RESINS AND THEIR COMPOSITION

BACKGROUND OF THE INVENTION

This invention relates to additives for resins and compositions comprising resins and said additives. More specifically, this invention relates to resin additives which are endowed with improved dispersibility by blending fine amorphous silica with A-type zeolites having specific properties or an acid treated product thereof, and compositions comprising resins and said additives as well as the uses thereof.

The additives of this invention are useful, especially as a filler, stabilizer, and antioxidant for various kinds of resins and also as an antiblocking agent for films.

DESCRIPTION OF THE PRIOR ART

It is well known that natural or synthetic zeolite powder can be used as a filler for various kinds of synthetic resins.

Further, owing to such specific properties as fine pores, cation exchangability arising from its unique three dimensional crystalline structure, it is well known to use zeolite as a more functional additive for resins (Japanese Patent Laid Open 51-23538 for example).

It has also been suggested that Na-A-type zeolites give heat stability to halogen containing resins (Japanese Patent Laid Open 54-34356).

The assignee of this invention also suggested that A-type zeolites which are produced by replacing Na-A-type zeolites with other metal cations, especially bivalent cations such as Ca, Zn and Pb, can improve the thermal stability of halogen containing resins (Japanese Patent Laid Open Nos. 55-142043, 55-164236, 56-14542, 56-72038, 56-120745, 56-147851, 57-25346 and 57-28145).

Further, the assignee of this invention has found that zeolite can improve the thermal stability of an ethylene containing vinyl acetate copolymer (Japanese Patent Laid Open 57-63342).

The assignee of this invention has also found that deterioration of a polyolefin can be prevented by metal substituted A-type zeolites (Japanese Patent Laid Open 57-67638).

A-type zeolites or amorphous aluminosilicates which are an acid treated product thereof are also known to have an effect for preventing blocking of resin films such as polyolefins (Japanese Patent Laid Open Nos. 58-118221, 58-180541, 60-32836, 49-23245, 50-16744, 55-21496).

Further, many applications such as reinforcing additives for synthetic rubber (Japanese Patent Laid Open 49-34936), paint additives (Japanese Patent Laid Open 51-69528) have been suggested and are also being utilized. However, conventional resin compositions formulated with A-type zeolites, Na-A-type zeolites or amorphous aluminosilicates as resin additives are not satisfactory in specific usages and conditions. The causes of these defects are deemed to be as follows: Zeolite powders used heretofore tend to agglomerate and are inferior in dispersibility when mixed with resins as in the case of other conventional inorganic powders. Owing to their inherent properties, it is difficult to avoid agglomeration, and when molded into a thin film layer, undesirable defects in quality such as fish-eyes often result.

In order to eliminate these deficiencies, surface treatment with certain kinds of phosphates, metallic soaps or organosilicate compounds has been suggested. However, the aforementioned problem in the basic dispersibility of a zeolite has not yet been solved.

The inventors of the present invention have completed the present invention as a result of efforts to improve dispersibility of a zeolite so as to let it bring its function into full play and improve the heat stability, antioxidizing and antiblocking properties of resin compositions.

SUMMARY OF THE INVENTION

An object of this invention is to provide a zeolite powder which has high free-flowability and low agglomerating properties.

Another object of this invention is to provide a zeolite additive which is superior in dispersibility and can impart heat stabilizing and antioxidizing properties to a synthetic resin when formulated therein.

A still other object of this invention is to provide zeolite additives which can improve the antiblocking properties of resin films.

A further object of this invention is to provide a synthetic resin composition formulated with said zeolite additives.

These objects and other objects which will be understood from the following description can be attained by admixing 100 parts by weight of resin with 0.01-50 parts of an additive which comprises (i) an A-type zeolite having substantially spherical particles and a median particle size of not larger than 5 $\mu$m or acid treated product thereof which maintains the original particle characteristics of said zeolite but shows an amorphous pattern according to X-ray diffraction and (ii) fine amorphous silica having a smaller particle size than said zeolite.

DESCRIPTION OF THE PREFERRED EMBODIMENT

A resin composition of this invention comprises resin and a determined amount of a specified additive.

An additive used in the present invention comprises (i) an A-type zeolite having specific characteristics or an acid treated product thereof which retains the original particle characteristics of said zeolite but shows amorphous properties according to X-ray diffraction and (ii) a fine amorphous silica having smaller particle size than said zeolite.

According to the present invention, an A-type zeolite comprises not only Na-A-type zeolites but also ion exchanged zeolites such as Ca-A-type, Ma-A-type, Zn-A-type, Pb-A-type, Cu-A-type or Ag-A-type zeolites.

Metal content of said ion exchanged A-type zeolites are not limited specifically. It may be changed according to the type of application. However, where the physio-chemical functions of an A-type zeolite such as heat stability or antiaging property for the resin is expected in usage, the remaining Na+ in a metal substituted A-type zeolite is preferably less than 10 wt.%, most preferably less than 5 wt.% calculated as $Na_2O$.

Among those metal substituted zeolites, Cu-A-type zeolites or Ag-A-type zeolites can be used in specific applications in accordance with their sterilizing capacity.

According to this invention, it is important that the A-type zeolite used have particle characteristics where the form of the primary particles is substantially spherical and that the median (R50) particle size is not larger than 5 μm, preferably being 0.5-4 μm and also that particle size distribution is narrow.

In this invention the term "substantially spherical" means that when observed by a scanning electron microscope (2000-5000 times magnification) the sharp edges of the cube disappear completely and a smooth and rounded surface is observed.

Hence, the particles of this invention can be easily distinguished from conventional zeolite particles having a sharp cubic form like a cube of sugar.

As a method for producing an A-type zeolite having a substantially spherical form, the assigneee suggested a process of mixing and reacting a sodium aluminate solution and sodium silicate solution eliminating back mixing (Japanese Patent Publication No. 59-17048).

Reaction without back mixing means a state wherein the mean residence time of reagents is less than 10 sec. and the previously reacted mixture does not affect succeeding mixing and reaction. As a reactor for carrying out said reaction, a small volume mixing apparatus having strong mixing effect may be used. For example, a tubular static mixer or centrifugal pump can be preferably used.

An A-type zeolite having the particle characteristics mentioned above has fine particle where the median (R50) particle size is not larger than 5 μm, preferably 0.5-4 μm, and there is such a sharp distribution that at least 60%, preferably 70% of said particles fall within a range of from ½ to 1½ that of said median.

According to the present invention, said particle size may be measured by a method using a Coulter counter.

The particle characteristics in the present invention play an important role not only in showing dispersibility superior to a conventional zeolite but are also important in achieving those functions advantageous for a resin additive when combined with fine amorphous silica.

In this invention, apart from said A-type zeolite, an acid treated product thereof which is an amorphous aluminosilicate according to X-ray diffraction, but which substantially has the original particle characteristics is also included.

Generally, an A-type zeolite is apt to react with acid and finally decompose if treated with a strong acid. The acid treated product of this invention is for example made by mildly treating a slurry of A-type zeolite with acid within a limit of pH 4.5, preferably 5-7.

The treated product is an amorphous aluminosilicate which shows substantially no detectable crystallinity when measured by X-ray diffraction but still retains the substantial particle characteristics of the original A-type zeolite and is chemically distinguishable from A-type zeolite.

Although said acid treated product shows particle characteristics so similar to those of A-type zeolites that it cannot be easily distinguished by appearance, it has none of the properties which an A-type zeolite exhibits such as cation exchangability, adsorptivity or reversible property of adsorption/desorption as well as not having the crystallinity of an A-type zeolite.

Hence, said acid treated product can be used more properly as an amorphous inorganic filler than as a stabilizer for resin.

Generally, among the many inorganic fillers, there are very few amorphous fillers, a rare example of which is silica. The acid treated product of this invention can be expected to have unique applications as one of the rare existing inorganic fillers. It has also excellent performance as an antiblocking agent for resin film just as an A-type zeolite has.

According to this invention, an A-type zeolite and acid treated product thereof may be hydrated compound containing bonding water or a dehydrated one.

When a resin containing a hydrated compound is molded, foaming of the resin may occur due to gasification of water. Such a problem will be avoided, however, either by adopting a molding method which can substantially prevent foaming or by using dehydrated additives.

The resin additives in the present invention are compositions which comprise (i) the above-mentioned A-type zeolites or acid treated amorphous products thereof and (ii) fine amorphous silica.

An amorphous silica to be an ingredient of the additive must be fine, and especially, its secondary particles as well as primary particles must be smaller than the average particle size of said A-type zeolites.

Generally, the particle size of said silica is 1-100 mμ, preferably 5-50 mμ and more preferably 10-20 mμ.

Although the ratio of amorphous silica to A-type zeolite or acid treated product thereof is not defined specifically, at least 0.2 wt.% is required. In many cases, 0.3-5.0 wt.% is preferable and if necessary about an equal quantity of said silica may be incorporated.

Composition ratio must be determined according to the particle characteristics of said A-type silica, type of silica, blending method or purpose of application. In case of silica content lower than 0.2 wt.%, dispersibility cannot be improved effectively and on the other hand 5 wt.% of silica is sufficient to render a composition dispersible. However, there is no need to limit the upper composition rate since some kinds of silica do not adversely affect dispersibility even when used excessively.

The resin additive of the present invention has much more remarkable lubricating qualities and is more free-flowing than A-type zeolites themselves and can improve their dispersibility in resins.

Although the mechanism of such effect is not fully clear, the following reasons may probably be assumed: An amorphous silica which is interposed between particles of an A-type zeolite having a median particle size not greater than 5 μm, preferably 0.5-4 μm, and a narrow particle distribution acts as a ball bearing and imparts lubricating qualities and free-flowing properties to the zeolite particles which facilitate the mutual movement of said particles.

The resin additive of the present invention can be produced, for example, using the following methods:

(1) An A-type zeolite or an acid treated product thereof which is an amorphous aluminosilicate maintaining the original particle characteristics (i) and an amorphous silica powder (ii) are mixed under shearing force (hereinafter referred to as "dry method").

(2) A silica sol is added to a slurry of said aluminosilicate (A-type zeolite or acid treated product thereof) and mixed and the then solid composition is separated from liquid, dryed by heating and pulverized (hereinafter referred to as "wet method").

The amorphous silica used in said dry method is not limited in its production method as long as it is fine. For example, a fumed silica provided by the gaseous hydrolysis of $SiCl_4$, $SiH_4$ or an organic silicon compound or a synthetic silica provided by acid decomposition of a sodium silicate solution are typically used.

In the dry method, it is important to mix under a strong shearing force in order to deagglomerate the ingredients after blending.

Hence, a mixing apparatus such as Henschel mixer which can exert strong shearing force on particles can be used, and if necessary, hydrophobic treatment of the particles surface may be done while mixing.

As surface treating agents, for example, organosilicate compounds, organotitanate compounds, higher fatty acids and their metal salts, higher alcohols, waxes or phosphoric esters can be mentioned. These agents are added to a mixer with an organic solvent, if necessary, to make the composition hydrophobic and more dispersible in a resin.

On the other hand, in the wet method an amorphous silica to be added is preferably silica sol.

When an amorphous silica other than a silica sol is used, even in the case of a wet method, a shear mixer such as a colloid mill, homogenizer or high speed mixer is required. When a silica sol is used, however, a conventional mixing process is sufficient and the effect is remarkably realized even with a small amount of sol.

Hence, as a method for producing resin additives in the present invention, the wet method using silica sol is most favorably adopted.

In the wet method, mixing of a slurry and an amorphous silica can be done at either room temperature or an elevated temperature.

Subsequent to the mixing, solid/liquid separation, washing, if necessary, and heat treatment are carried out. Heat treatment comprises calcination for dehydration of the bonding water as well as heating for the mere drying of moisture.

Accordingly as the heating conditions a temperature within a range of from 100° to 450° C. can be appropriately selected depending on whether the required product is to be hydrated or dehydrated.

The product is then pulverized in a conventional manner and, if necessary, a hydrophobic treatment may be further carried out as in the case of said dry method.

The thus obtained resin additives have surprisingly superior lubricating qualities and free-flowing properties. These properties are so subtle that they can be tested most clearly and easily by the sense of touch in the fingers.

According to the present invention, many kinds of resins can be used without special limitations. For example, the following resins can be mentioned, i.e. polyvinylchloride, polyvinylidenechloride, chlorinated polyolefin, polyvinylbromide, polyvinylfluoride, copolymerized halogen containing resins, poly α-olefins such as polyethylene, polypropylene and polybutene, copolymers of α-olefin and other monomers such as ethylene-vinylacetate copolymers and ethylene-acrylate copolymers, polyacetal resins, polyamide resins, silicon resins, polyester resins and so forth.

The additive of this invention may be used together with other additives such as plasticizers, stabilizers, chelators, antioxidants, lubricants or pigments. It may be used, if necessary, as a one-package formulation in which an additive in the present invention and other ingredients as mentioned above are premixed together.

According to this invention, the quantity of an additive to be used may be properly defined depending on the purpose of usage, the type of additive or the grade of resin. Generally, 0.01–50 wt. parts based on 100 wt. parts of resin, preferably 0.1–5 wt. parts of an additive may be used. An additive of less than 0.01 wt. parts cannot impart sufficient effects, while an additive of more than 50 wt. parts does not contribute to any increase in effects and, on the contrary, it is disadvantageous in an economical sense.

Examples of preferable amounts of an additive to improve a variety of resin properties are shown below by weight parts to 100 wt. parts of a resin: 0.01–2 for an antiblocking agent, 0.1–5 for a heat stabilizer, 0.1–50 for a filler and 0.1–5 for an antioxidant.

The resin composition of the present invention can be molded into pellets, films, sheets, boards or into various shaped articles.

The resin composition according to this invention can also be used for coating or impregnating papers or fabrics.

In these molding processes, a master batch may be made, at first, by blending an additive, plasticizer, pigment and other ingredients with resin, and then said master batch may be mixed with additional resin and molded by extrusion, injection or other processes to get molded articles in which an additive is uniformly dispersed.

The additive of the present invention has significantly high lubricating and free-flowing properties, and has not the least tendency to form secondary agglomerate particles. The additive can provide a resin composition which has no trouble such as with fish-eyes due to poor dispersibility but has improved heat stability, antioxidizing and antiblocking properties.

In order to illustrate this invention more concretely, examples are shown hereafter.

Preparation of Samples (Samples 1 and 2)

A sodium silicate aqueous solution ($Na_2O = 8.1$ wt.%, $SiO_2 = 6.6$ wt.%) and sodium aluminate aqueous solution ($Na_2O = 9.3\%$, $Al_2O_3 = 5.6\%$) were mixed instantaneously eliminating back mixing by introducing simultaneously them into a static mixer at a mol ratio of $SiO_2/Al_2O_3 = 2$. After maturing the thus obtained aluminosilicate gel for 2 hours at 70° C., a crystalline slurry of Na-A-type zeolite was obtained. An analysis of the crystal X-ray diffraction showed a Na-A-type zeolite pattern. The particle characteristics of the zeolite ($Na_2O.Al_2O_3.2SiO_2.4.5H_2O$) are shown in Table 1.

After repulping the zeolite thus obtained to make a 30 wt.% concentration slurry, silica sol ($SiO_2 = 20.5$ wt.%, particle size 10–20 mµ) was added and mixed to the slurry in an amount of 0.5 wt.% ($SiO_2$/zeolite solid) (Sample No. 1), and 1.0 wt.% (Sample No. 2) respectively.

After solids separation, drying at 120° C. and pulverizing, an additive for resins (Samples No. 1 and 2) was obtained.

TABLE 1

| | |
|---|---|
| Particle shape (observed by electron microscope) | Substantially spherical particles Sharp edge of cube disappeared |
| X-ray diffraction | A-type zeolite pattern |
| Median (R50) of particle size | 2.5 µ |
| Particles in range (± ½ Median) | 82.5% |

(Samples 3-5)

250 wt. parts of zeolite slurry (20 wt.% concentration) was made using Na-A-type zeolite obtained in preparation of samples 1 and 2. The slurry showed a pH of 11.7.

While stirring the slurry, 250 wt. parts of sulphuric acid (4 wt.% conc.) was added gradually and stirring proceeded for 1 hr. after addition of the acid. The slurry showed a pH of 5.3. The treated product was filtered and washed with water.

To a repulped slurry of the thus obtained acid treated product, silica sol was added in an amount of 1.0 wt.% of $SiO_2$ to solid zeolite in the slurry. After mixing, filtration, dyring and pulverization, Sample No. 3 was obtained.

On the other hand, a filtrate cake in above Sample No. 3 was dehydrated for 2 hrs. at 450° C. After pulverizing, Sample No. 4 was obtained.

A mixture solution of 3 wt. parts of methyl hydrogen polysiloxan and 18 wt. parts of benzene was added to 100 wt. parts of sample No. 4 and mixed with a shearing force using a Henschel mixer. A hydrophobically treated Sample No. 5 was thus obtained.

Properties of each sample are shown in Table 2.

TABLE 2

|  |  | Sample 3 | Sample 4 | Sample 5 |
|---|---|---|---|---|
| Chemical composition (wt. %) | $Na_2O$ | 6.5 | 9.0 | 9.0 |
|  | $Al_2O_3$ | 35.0 | 43.5 | 43.5 |
|  | $SiO_2$ | 38.5 | 45.8 | 45.6 |
|  | $H_2O$ | 21.0 | 1.8 | 1.6 |
| Median (R50) of particle size (μm) |  | 2.5 | 2.7 | — |
| Particles in range (± ½ Median) (%) |  | 87 | 82 | — |
| Particle shape (observed by electron microscope) |  | Substantially spherical No difference between original zeolite | same as left | same as left |
| X-ray diffraction |  | amorphous | same as left | same as left |

(Samples 6-8)

A zeolite slurry (30 wt.% conc.) was made by repulping a Na-A-type zeolite obtained in preparation of samples 1 and 2. To each fraction of the slurry, silica sol was added in an amount of 0.42 wt.%, 1.0 wt.% and 2 wt.% of $SiO_2$ solid zeolite in the slurry and mixed for a while.

Then a $CaCl_2$ solution (10 wt.% conc.) in an amount corresponding to two times the exchange equivalent of $Ca^{++}$ for $Na^+$ was added to the slurry. After stirring for 5 hrs. at room temperature, filtration, washing, drying and pulverizing, Samples 6, 7 and 8 Ca-A-type zeolite powder were obtained.

The properties of each sample are shown in Table 3.

TABLE 3

| Median (R50) of particle size (μm) | 2.2 ± 0.1 |
|---|---|
| Particle in range (± ½ Median) (%) | 84 ± 2 |
| Particle shape | Substantially spherical without sharp edges |
| CaO content (wt. %) | 10.7–10.9 |
| Remaining $Na_2O$ (wt. %) | 3.8–3.9 |

(Samples 9-14)

A ca-A-type zeolite powder was prepared according to the process for preparation of Samples 6-8 except that silica sol was not added.

A fumed silica in an amount of 0.5, 1.0 and 2.0 wt. parts and a white carbon (wet method silica) in amounts of 1.0, 2.0 and 5.0 wt. parts were added to each of 6 batches which contained 100 wt. parts of said zeolite powder, and then mixed uniformly by a Henschel mixer. These samples were designated as Samples 9, 10, 11, 12, 13 and 14 in the order described.

(Sample 15)

A Zn-A-type zeolite was prepared according to the process for preparing Sample 7 wherein 1.0 wt.% of silica sol was used except that $CaCl_2$ solution was replaced by $ZnSO_4$ solution at an ion exchanging step.

The zeolite thus obtained showed the following particle characteristics:

The median (R50) particle size was 2.5 μm, 80% of the particles were within a range of ±½ median, ZnO content was 19.2 wt.%, remaining $Na_2O$ was 2.6 wt.% and particle shape was substantially spherical without sharp edges.

(Comparative Sample 24)

A sodium silicate solution was poured into a vessel containing sodium aluminate wherein both ingredients were the same as used in preparation of samples 1 and 2, and the $SiO_2/Al_2O_3$ ratio was 2.0. The mixture gel was stirred and matured to give crystalline zeolite. X-ray diffraction, electron microscopy and a Coulter counter test showed that the zeolite crystal had the following particle characteristics: the crystal was a Na-A-type zeolite having the sharp edges of a cube. Median (R50) particle size was 2.6 μm, particles within a range of the median (R50) ±½ median was 51.6%.

After washing, the zeolite was repulped to make a slurry (40 wt.% conc.) and mixed with silica sol in an amount of 1.0 wt.% of $SiO_2$ to solid zeolite in a slurry.

After separation by filteration and drying at 120° C. and pulverization, a comparative Sample 24 was obtained.

(Comparative Sample 25)

The gel obtained by instantaneous mixing of sodium silicate and sodium aluminate according to a process preparing Samples 1 and 2 was diluted to a lower alkali content in a mother liquor into 5.0 wt.% as NaOH, and matured to a crystalline zeolite for 3 hrs. at 90° C. The thus obtained zeolite crystals showed the following particle characteristics:

Median (R50) particle size was 7.1 μm, particles within a range of ±½ median were 78%, particle shape was uniform cubes having sharp edges.

In the same manner as in preparing Sample 2, silica sol in an amount of 1.0 wt.% of $SiO_2$ to solid zeolite was added to a zeolite slurry. After filtering, drying and pulverizing, comparative Sample 25 was obtained.

The zeolite thus obtained showed good dispersibility and free-flowability. However, due to several defects mentioned below, said zeolite was unsuitable as a resin additive: As particle size was too large, the surfaces of resin films or molded articles were rough, which resulted in the abrasion of the extruder or molding machine.

Evaluation Test (1) Lubricating zeolites and Free-flowing Properties

Organoleptic tests were adopted, wherein the lubricating qualities were evaluated by feel with direct finger touch, and free flowing properties were evaluated by observing the behavior of powders in a transparent resin bag when pressed by fingers.

Each organoleptic test was carried out but by a panel of 20 members and evaluations were represented by 4 ranks;  for the most superior, o for good, Δ for not so good and x for bad.

The test results are shown in Table 4.

TABLE 4

| Sample | Sample Composition Aluminosilicates | Silica Type | Wt. % | Lubricating Qualities Free-flowing Properties |
|---|---|---|---|---|
| 1 | Na - A-type zeolite | silica sol | 0.5 | Δ |
| 2 | " | " | 1.0 | |
| 3 | amorphous aluminosilicate (hydrated) | " | 1.0 | |
| 4 | amorphous aluminosilicate (dehydrated) | " | 1.0 | |
| 5 | hydrophobic amorphous aluminosilicate (dehydrated) | " | 1.0 | |
| 6 | Ca - A-type zeolite | " | 0.42 | |
| 7 | " | " | 1.0 | |
| 8 | " | " | 2.0 | |
| 9 | " | fumed silica | 0.5 | |
| 10 | " | " | 1.0 | |
| 11 | " | " | 2.0 | |
| 12 | " | wet method silica | 1.0 | |
| 13 | " | wet method silica | 2.0 | |
| 14 | " | wet method silica | 5.0 | |
| 15 | Zn - A-type zeolite | silica sol | 1.0 | |
| 16 | Na - A-type zeolite | — | — | X |
| 17 | amorphous aluminosilicate (hydrated) | — | — | X |
| 18 | amorphous aluminosilicate (dehydrated) | — | — | X |
| 19 | Ca - A-type zeolite | — | — | X |
| 20 | Zn - A-type zeolite | — | — | X |
| 24 | Na - A-type zeolite (cubic) | silica sol | 1.0 | X |

(note)
Samples 16~20 contained no silica, and were tested as controls.

(2) Dispersibility Heat Stability in Polyvinylchloride

A composition consisting of 100 wt. parts of polyvinylchloride, 30 wt. parts of DOP, 0.5 wt. parts of stearic acid, 4 wt. parts of epoxy soybean oil and 3 wt. parts of the additive of the present invention was mixed and kneaded for 5 min. at 190° C., and then test pieces (0.3 mm×3 cm×4 cm) were produced from the composition.

Test pieces were inspected through optical microscope (100 times magnification) for the existence of agglomerated particles.

Test pieces in which substantially no agglomeration was detected were ranked as grade 4 while the worst ones were ranked as 1.

On the other hand, the heat stability of the test pieces were evaluated by observing the hourly change of their color when heated in a Geer oven at 190° C.

Evaluation was ranked in 6 grades according to the following criteria.

0 non colored
1 slightly colored
2 light yellow
3 yellow
4 brown
5 black

Test results are shown in Table 5.

TABLE 5

| Sample No. | Dispersibility | Thermal Stability (coloring in Geer oven) | | | | | |
|---|---|---|---|---|---|---|---|
| | | 0 min. | 10 min. | 30 min. | 60 min. | 90 min. | 120 min. |
| 6 | 3 | 0 | 0 | 0 | 1 | 2 | 2 |
| 7 | 4 | 0 | 0 | 0 | 0 | 1 | 1 |
| 9 | 2 | 0 | 0 | 0 | 1 | 2 | 2 |
| 11 | 4 | 0 | 0 | 0 | 0 | 1 | 2 |
| 13 | 3 | 0 | 0 | 0 | 0 | 2 | 2 |
| 15 | 4 | 0 | 0 | 0 | 0 | 1 | 2 |
| 19 | 1 | 0 | 0 | 0 | 1 | 2 | 3 |
| 20 | 1 | 0 | 0 | 1 | 1 | 2 | 3 |
| 21 | 4 | 0 | 1 | 1 | 2 | 4 | 5 |

(note)
Sample 21 was a blank sheet without additive.

(3) Antiblocking Properties in Polypropylene Film

A resin composition consisted of 100 wt. parts of polypropylene (MFR 1.9 g/10 min.), 0.1 wt. parts of antioxidant (2,6-di-t-butyl-p-cresol), 0.02 wt. parts of Irganox 1010, 0.05 wt. parts of Ca-stearate and a scheduled amount of additives of this invention or comparative samples were mixed by super mixer and then pelletized by extruder.

These pellets were melted again and extruded into sheets and then oriented stepwise (machine direction: 5 times, transverse direction: 10 times) to make a film 30 μm thick. One inside of the film was treated by corona arc.

With respect to the film, transparency, blocking and heat stability tests were carried out.

The transparency test was made according to ASTM-D-1003 on the 4 sheets of film piled up one over another.

The blocking test was carried out as follows: 2 sheets of film were overlapped so as to have a matualy contact area of 10 cm². After 7 days of being pressed under 50 g/cm² exerted through 2 plates of glass at 40° C., 2 sheets of film were peeled off by a Schopper tester at a rate of 500 mm/min. and the maximum load for peel off was recorded.

Fish-eyes in the films were inspected by an optical microscope (100 times magnification).

The test results were shown in Table 6.

TABLE 6

| Sample No. | | Additive (wt. parts) | Film Properties | | |
|---|---|---|---|---|---|
| | | | Transparency (%) | Blocking (g/10 cm²) | Fish-eyes |
| Examples | 2 | 0.08 | 9.0 | 70 | none |
| | 3 | 0.08 | 10.5 | 10 | none |
| | 4 | 0.08 | 13.0 | 50 | none |
| | 5 | 0.04 | 7.8 | 350 | none |
| | | 0.08 | 12.5 | 10 | |
| | 6 | 0.08 | 10.8 | 20 | none |
| | 8 | 0.04 | 7.8 | 400 | none |
| | | 0.08 | 12.5 | 0 | |
| | 11 | 0.06 | 10.3 | 280 | none |
| | 14 | 0.08 | 12.9 | 30 | none |
| Controls | 16 | 0.08 | 8.5 | 70 | found |
| | 18 | 0.08 | 9.5 | 80 | found |
| | 19 | 0.08 | 10.5 | 50 | found |
| | 22 | 0.15 | 14.5 | 1050 | found |
| | 23 | — | 2.0 | 2400 | — |

(note)
Sample 22 contains a synthetic silica and sample 23 contains no additive.

(4) Several Effects on Polyethylene Resins

A composition which comprises 100 wt. parts of high density polyethylene (MI: 0.9), antioxidants, lubricant and the additives in this invention the amount of which are defined in Table 7 were evaluated in several areas.

(a) Heat Stability

After kneading polyethylene compositions by test rolls (front roll surface: 160° C., and rear roll: 120° C.) for 5 min., test pieces (0.5 mm×3 cm×5 cm) were provided.

The pieces were put in a Geer oven maintained at 200° C. Heat stability was evaluated in three ranks by observing hourly coloring changes.
1.0 non-colored
2.0 light yellow
3.0 yellow (b) Bleeding The test pieces were exposed to ultraviolet radiation for 24 hrs.

Bleeding was evaluated by inspecting bleed out of additives to the surface of the pieces and ranked in 3 grades.
1.0 No bleeding observed
2.0 Slight bleeding observed
3.0 Bleeding observed (c) Blooming The test pieces were dipped in hot water (70° C.) for 24 hrs. After drying in air blooming was evaluated by inspecting blooming and ranked in 3 grades.
1.0 No blooming observed
2.0 Slight blooming observed
3.0 Blooming observed (d) Roll Stickiness Roll stickiness was evaluated by observing resin adhesion to the rolls when being mixed and kneaded, and ranked in 3 grades.
1.0 No adhesion observed
2.0 Slight adhesion observed
3.0 Adhered to rolls (e) Dispersibility The same evaluation method as for polyvinylchloride was employed.

TABLE 7

| | | | Controls | | | | | | | Examples | | | | | |
|---|---|---|---|---|---|---|---|---|---|---|---|---|---|---|---|
| | | | Run No. | | | | | | | | | | | | |
| | | | 1 | 2 | 3 | 4 | 5 | 6 | 7 | 8 | 9 | 10 | 11 | 12 | 13 |
| Formulation | Ca - stearate | | 0.2 | 0.2 | 0.2 | 0.2 | 0.2 | 0.2 | 0.2 | 0.2 | 0.2 | 0.2 | 0.2 | 0.2 | 0.2 |
| | 2,6-di-t-butyl-p-cresol (BHT) | | 0.2 | | | | | | 0.1 | 0.1 | | | 0.1 | | |
| | 2,2-bis-(4'-oxypheneyl) propane (bisphenol-A) | | | 0.2 | | | | 0.1 | | | 0.1 | | | | |
| | 4,4'-butylidene-bis(3-methyl-6-t-butylphenol) | | | | 0.2 | | | | | | | 0.1 | | | |
| | pentaerythrityl-tetrakis [3-(3,5-di-t-butyl-4-hydroxyphenyl) propionate] | | | | | 0.2 | 0.1 | | | | | | | 0.1 | 0.05 |
| | Ca - A-type zeolite (sample No. 6) | | | | | | | | | 0.1 | | | | | |
| | Ca - A-type zeolite (sample No. 7) | | | | | | | | | | 0.1 | | | 0.1 | 0.2 |
| | Ca - A-type zeolite (sample No. 8) | | | | | | | | | | | 0.2 | | | |
| | Zn - A-type zeolite (sample No. 15) | | | | | | | | | | | 0.1 | | | |
| | Ca - A-type zeolite (sample No. 19) | | | | | | | 0.1 | | | | | | | |
| | Zn - A-type zeolite (sample No. 20) | | | | | | | | 0.1 | | | | | | |
| Heat Stability | Hourly Coloring Changes in Geer Oven (200° C.) | original pieces | 1.0 | 1.0 | 1.0 | 1.0 | 1.0 | 1.0 | 1.0 | 1.0 | 1.0 | 1.0 | 1.0 | 1.0 | 1.0 |
| | | 15 min. | 1.0 | 3.1* | 1.0 | 1.0 | 1.0 | 2.5* | 2.0 | 1.0 | 2.0* | 1.0 | 1.0 | 1.0 | 1.0 |
| | | 30 min. | 2.0 | 3.0 | 1.5 | 1.0 | 2.0 | 2.5 | 2.0 | 1.0 | 2.0 | 1.0 | 1.0 | 1.0 | 1.0 |
| | | 45 min. | 2.0 | 3.0 | 1.5 | 1.0 | 2.5 | 2.5 | 3.0 | 1.5 | 3.0 | 1.0 | 1.5 | 1.0 | 1.0 |
| | | 60 min. | 2.5 | 3.0 | 2.0 | 1.0 | 2.5 | 3.0 | 3.0 | 2.5 | 3.0 | 1.0 | 2.0 | 1.0 | 2.0 |
| | | 90 min. | 3.0 | 3.0 | 2.0 | 1.0 | 3.0 | 3.0 | 3.5 | 3.0 | 3.0 | 1.5 | 2.5 | 1.0 | 2.0 |
| Bleeding | | | 2.0 | 2.0 | 2.0 | 1.0 | 1.0 | 1.0 | 1.0 | 1.0 | 1.0 | 1.0 | 1.0 | 1.0 | 1.0 |
| Blooming | | | 3.0 | 2.0 | 2.0 | 1.0 | 1.0 | 2.0 | 2.0 | 1.0 | 1.0 | 1.0 | 1.0 | 1.0 | 1.0 |
| Roll Stickiness | | | 2.0 | 3.0 | 2.0 | 2.0 | 2.0 | 1.0 | 1.0 | 1.0 | 2.0 | 1.0 | 1.0 | 1.0 | 1.0 |
| Dispersibility | | | — | — | — | — | — | 1 | 1 | 3 | 4 | 4 | 3 | 4 | 4 |

(note)
When bisphenol is incorporated, color turns to grey.

Effects of the Invention

The additive according to this invention has superior dispersibility in various synthetic resins owing to its high lubricating qualities and free-flowing properties. Accordingly it can accelerate the exhibition of the function which an A-type zeolite is originally endowed with, and moreover by imcorporating said additive into resins, a variety of their properties such as heat stability, moldability, antioxydizing or antiblocking properties can be improved.

The additive of this invention can also prevent serious troubles such as fish-eyes in a resin film due to lack of dispersion.

The resin composition of this invention can be easily molded into pellets, films, sheets or boards, and it can be fabricated easily to produce textile or paper coating.

What we claim is:

1. An additive for thermoplastic resins in the form of a homogeneously mixed powder which improves heat stability of the resins and antiblocking property of a film made from the resins comprising
   (i) zeolite A, the primary particles of which have substantially a spherical form and a particle size distribution wherein medial (R50) particle size is within a range of from 0.5 to 4 $\mu$m and at least 60% of the particles of said zeolite fall within the range of from $\frac{1}{2}$ to $1\frac{1}{2}$ of said median,
   (ii) 0.2 to 5% by weight (as $SiO_2$) based on said zeolite A of fine amorphous silica having particle sizes within a range of from 1 to 100 m$\mu$.

2. An additive for thermoplastic resins according to claim 1, wherein said zeolite A is a Na-zeolite A.

3. An additive for thermoplastic resins according to claim 1, wherein said zeolite A is one of a substituted zeolite A in which Na of the Na-zeolite A is replaced by at least one metal selected from the group consisting of Ca, Mg, Zn, Pb, Cu and Ag.

4. An additive for resin according to claim 3, wherein the remaining Na in a substituted zeolite A is less than 10% by weight calculated as $Na_2O$.

5. An additive for resin according to claim 1, wherein the particle size of said amorphous silica falls within a range of from 5 to 50 m$\mu$.

6. An additive for resin according to claim 1, wherein the particle size of said amorphous silica falls within a range of from 10–20 m$\mu$.

7. An additive for thermoplastic resins according to claim 1 characterized in that said additive is made by adding 0.2 to 5% by weight (as $SiO_2$) based on the zeolite A of silica sol to a slurry of zeolite A, the primary particles of which have substantially a spherical form and a particle size distribution wherein median (R50) particle size is within a range of from 0.5 to 4 $\mu$m and at least 60% of the particles of said zeolite falls within the range from $\frac{1}{2}$ to $1\frac{1}{2}$ of said median.

8. An additive for thermoplastic resins according to claim 7, wherein said zeolite A is Ca-zeolite A.

9. An additive for thermoplastic resins according to claim 1, wherein the additive is an antiblocking agent for polyolefin film.

10. An additive for thermoplastic resins according to claim 5, wherein the additive is a heat stabilizer or an antioxidant for polyolefin and polyvinylchloride resins.

11. An additive for thermoplastic resin according to claim 9 or 10 characterized in that said additive is made by adding 0.2 to 5% by weight (as $SiO_2$) based on the Ca-zeolite A of silica sol to a slurry of Ca-zeolite A, the primary particles of which have substantially a spherical form and a particle size distribution wherein median (R50) particle size is within a range of from 0.5 to 4 $\mu$m and at least 60% of the particles of said zeolite falls within the range from $\frac{1}{2}$ to $1\frac{1}{2}$ of said median.

* * * * *